Patented Oct. 25, 1949

2,485,634

UNITED STATES PATENT OFFICE 2,485,634

MARGARINE AND BUTTER COMPOSITIONS

Hans W. Vahlteich, Edgewater, and Ralph H. Neal, North Bergen, N. J., and Chester M. Gooding, Staten Island, N. Y., assignors to The Best Foods, Inc., New York, N. Y., a corporation of New Jersey No Drawing. Application May 13, 1947, Serial No. 747,848

12 Claims. (Cl. 99—119)

This application is a continuation-in-part of the copending applications Serial No. 608,101 filed July 31, 1945, 608,102 filed July 31, 1945, and 608,380 filed August 1, 1945.

This invention relates to margarine and more particularly to an improved margarine which possesses marked moisture retention characteristics.

An object of this invention is to retain a material amount of milk moisture in margarine and to prevent the exudation of moisture therefrom.

Another object of this invention is to prevent the so-called "weeping" of margarine and butter.

Another object of this invention is simultaneously to prevent substantially the exudation of milk moisture from margarine and to retard for relatively prolonged periods the development of rancidity of margarine and butter.

Margarine, containing as it does aqueous and oleaginous components, sometimes develops a moisture film or moisture droplets on the outside thereof. This leakage of moisture results in underweight prints, increases the danger of bacterial and mold growth and materially affects the salability of the margarine. Then, too, rancidity sometimes develops in margarine which also materially affects the salability of the product. Various materials have been heretofore proposed for obtaining the retention of moisture within the prints of margarine to prevent the weeping of the margarine. Monoglycerides of fatty acids are perhaps the most widely, commercially used preparations for this purpose. But monoglycerides of fatty acids have substantially no effect on retarding the rancidity of margarine.

In accordance with this invention, a new margarine is produced which has high moisture retaining properties and which does not manifest leakage or weeping. In addition, in accordance with another aspect of this invention, the rancidity of margarine is materially retarded. The new margarine comprises in addition to the usual components, such as deodorized fats, milk, salt, lecithin, vitamins, etc., a dialkyl or dialkylene ester of citric acid in which the alkyl or alkylene group has at least 8 carbon atoms. The concentration of the dialkyl or dialkylene esters of citric acid in the new margarine may vary over wide limits depending upon inter alia, the amount of milk moisture in the margarine emulsion, the method of chilling, and the apparatus employed for the processing of the margarine; but a concentration of .05 to 1.5% by weight of the diesters of citric acid in the margarine is satisfactory. Desirably, the alkyl group of the dialkyl ester of citric acid has at least 12 carbon atoms, and the alkylene group of the dialkylene ester of citric acid has at least 16 carbon atoms. The preferred concentration of the dialkyl ester is .2 to .5% by weight of the ester in the margarine when the alkyl groups in the ester have from 8 to 16 carbon atoms and .1 to .3% by weight of the ester when the alkyl group has at least 16 carbon atoms. The preferred concentration of the dialkylene ester of citric acid is ¼ to ½% by weight of the ester in the margarine, and desirably the alkylene group of the dialkylene ester has at least 16 carbon atoms. Monoalkyl esters of citric acid, especially monesters in which the alkyl group has at least 16 carbon atoms also manifest marked moisture retention characteristics when incorporated in margarine. However, a greater quantity of such monoesters is required than diesters to effect similar moisture retention properties, and a greater concentration of such monoesters in margarine is sometimes objectional from a flavor standpoint.

While the dialkyl ester of citric acid and the dialkylene ester of citric acid sometimes appear to improve to a small degree the retardation of rancidity in margarine, the new margarine may be markedly improved from a rancidity standpoint by the addition thereto of a monoalkyl or monoalkylene ester of citric acid. The monoalkyl or monalkylene ester of citric acid which may also be included in the new margarine, may have any number of carbon atoms in the alkyl or alkylene group, although conveniently it contains the same number of carbon atoms as the dialkyl or dialkylene ester which is included in the composition. For example, the monoalkyl or monoalkylene esters may have at least 8 carbon atoms in the alkyl or alkylene group, or the monoalkylene ester may have at least 16 carbon atoms in the alkylene group, or the monoalkyl ester may have at least 12 carbon atoms in the alkyl group. By employing both the dialkyl or dialkylene esters of citric acid and the monoalkyl or monoalkylene esters of citric acid, the resulting new margarine has high moisture retaining properties, and in addition, manifests a marked resistance to rancidity. The amount of monoalkyl or monalkylene esters of citric acid may be within the range of .002 to 1%, and preferably within the range of .01 to .1%, by weight in the margarine. Conveniently, the diesters and monoesters of citric acid may be prepared simultaneously. This simultaneous production of the mono and corresponding diesters of citric acid can be achieved by reacting the required amount of anhydrous citric acid or citric acid monohydrate with an alkyl or alkylene alcohol to produce the desired amount of the diesters together with an amount of the corresponding monoesters of citric acid.

The diester of citric acid may be incorporated in the margarine at any stage of its preparation or in the deodorized fat prior to the use of the fat in the production of the margarine. To prevent the exudation of milk moisture from, and retard the rancidity of, the margarine, a mixture of dialkyl and monoalkyl esters of citric acid or a mixture of dialkylene and monoalkylene esters of citric acid is used. Preferably, such mixture is added to the fat shortly after the deodorization of the fat, since the fat starts to deteriorate immediately upon the completion of the deodorization. The diesters of citric acid or the mixture of the mono and diesters of citric acid may be incorporated at other points in the process, such as in the churning step, depending upon the particular sequence of processing steps employed. However, it is desirable that the monoester and diester of citric acid be added subsequent to the deodorization of the fat, since a major portion of the esters of citric acid may be rendered ineffective in the deodorization step.

The dialkyl or dialkylene esters of citric acid, desirably with monoalkyl or monoalkylene esters of citric acid, may be a single specie or a plurality of species. For example, it is advantageous in some cases to incorporate in the margarine, a mixture of distearyl and dipalmityl citrates together with monostearyl and monopalmityl citrates, while in other cases, the addition of a mixture of distearyl citrate and monostearyl citrate is desirable. If a mixed alcohol is employed for the preparation of the citric acid esters, the resulting mixture contains some mixed esters of citric acid. For example, if a mixture of palmityl and stearyl alcohols is reacted with citric acid in the required proportions, the resulting product comprises in addition to dipalmityl citrate, distearyl citrate, monopalmityl citrate and monostearyl citrate, some mixed diesters of citric acid and palmityl and stearyl alcohols.

The efficacy of the dialkyl and dialkylene esters of citric acid in increasing substantially the moisture retention characteristics of margarine is demonstrated in the following tables in which margarines containing a mono or a dialkyl ester of citric acid or a mono or a dialkylene ester of citric acid are compared with margarine prepared under identical conditions but without these compounds. For further comparison, margarine containing tristearyl citrate was included in this testing. In Table 1, a margarine containing a mixture of monostearyl citrate, distearyl citrate and tristearyl citrate, or containing pure monostearyl citrate, or containing pure distearyl citrate, or containing pure tristearyl citrate is compared with samples of margarine, designated in the table as the control samples, which were prepared under identical conditions except that no ester of citric acid was incorporated therein. In Table 2, margarine without any citric acid esters is compared with margarine containing pure monostearyl citrate or pure distearyl citrate or a mixture of mono, di and tristearyl citrates. Table 3 shows a comparative testing of a margarine having incorporated therein a mixture of mono, di and trioctyl citrates, a margarine having incorporated therein a mixture of mono, di and trilauryl citrates, a margarine having incorporated therein a mixture of mono, di and trioleyl citrates and a margarine designated in the table as the control, which was prepared under identical conditions, except that no esters of citric acid were incorporated therein.

Table 1

| Sample | Observation of moisture leakage on rolls | Percent moisture after tempering at 60° F. and after blending in mixer prior to addition of excess water | Percent moisture after addition of excess water and blending in mixer | Free moisture remaining in mixer after addition of excess water and blending in mixer |
|---|---|---|---|---|
| | | | | Cubic centimeters |
| 1. Control (Margarine without addition of any ester) | Serious leakage | 15.5 | 14.8 | 15 |
| 2. Margarine containing 0.25% Monostearyl Citrate | Slight leakage | 15.5 | 19.0 | 3.5 |
| 3. Margarine containing 0.25% Distearyl Citrate—pure | No leakage | 15.7 | 18.4 | 1.5 |
| 4. Margarine containing 0.25% Tristearyl Citrate—pure | Serious leakage | 13.5 | 12.2 | 20 |
| 5. Margarine containing 0.25% of a mixture comprising about 50% Distearyl Citrates and 15% Monostearyl Citrates. | No leakage | 16.6 | 19.0 | 1.6 |
| 6. Margarine containing 0.5% Monostearyl Citrate | do | 15.8 | 18.7 | 2.2 |
| 7. Margarine containing 0.5% Distearyl Citrate | do | 15.4 | 18.8 | 1.7 |
| 8. Margarine containing 0.5% Tristearyl Citrate | Serious leakage | 13.8 | 12.3 | 19 |
| 9. Margarine containing 0.5% of a mixture comprising about 50% Distearyl Citrate and about 15% Monostearyl Citrate. | No leakage | 15.6 | 18.1 | 1.0 |
| 10. Control (Margarine without addition of any ester) | Serious leakage | 15.2 | 14.6 | 18 |

Table 2

| Sample | Observation of moisture leakage on rolls | Percent moisture after tempering at 60° F. and after blending in mixer prior to addition of excess water | Percent moisture after addition of excess water and blending in mixer | Free moisture remaining in mixer after addition of excess water and blending in mixer |
|---|---|---|---|---|
| | | | | Cubic centimeters |
| 1. Margarine without addition of any ester | Serious leakage | 14.2 | 14.0 | 16.5 |
| 2. Margarine containing 0.25% Monostearyl Citrate—pure | Slight leakage | 15.5 | 18.1 | 3.5 |
| 3. Margarine containing 0.25% Distearyl Citrate—pure | No leakage | 15.4 | 17.7 | 1.1 |
| 4. Margarine containing 0.25% of a mixture comprising about 50% Distearyl Citrate and 15% Monostearyl Citrate. | do | 15.2 | 18.1 | 1.1 |
| 5. Margarine containing 0.15% of a mixture comprising about 50% Distearyl Citrate and about 15% of Monostearyl Citrate. | do | 15.3 | 17.5 | 1.8 |

Table 3

| Sample | Observation of moisture leakage on rolls | Percent moisture after tempering at 60° F. and after blending in mixer prior to addition of excess water | Percent moisture after addition of excess water and blending in mixer | Free moisture remaining in mixer after addition of excess water and blending in mixer |
|---|---|---|---|---|
| | | | | *Cubic centimeters* |
| 1. Control (margarine without addition of any ester) | Serious leakage | 13.6 | 13.6 | 15 |
| 2. Margarine containing 0.25% of a mixture comprising about 50% of dioctyl citrate and about 15% of mono-octyl citrate. | No leakage | 15.0 | 14.9 | 13 |
| 3. Margarine containing 0.25% of a mixture comprising about 50% dilauryl citrate and about 15% of monolauryl citrate. | do | 15.2 | 16.5 | 8 |
| 4. Margarine containing 0.25% of a mixture comprising about 50% of dioleyl citrate and about 15% of mono-oleyl citrate. | Slight leakage | 15.0 | 15.1 | 14 |
| 5. Margarine containing 0.25% of a mixture comprising about 50% distearyl citrate and about 15% monostearyl citrate. | No leakage | 15.4 | 18.1 | 0.5 |
| 6. Control (margarine without addition of any ester) | Serious leakage | 14.5 | 13.7 | 15 |
| 7. Margarine containing 0.50% of a mixture comprising about 50% di, octyl citrate and about 15% of monooctyl citrate. | No leakage | 15.1 | 17.7 | 4 |
| 8. Margarine containing 0.50% of a mixture comprising about 50% dilauryl citrate and about 15% monolauryl citrate. | do | 15.1 | 17.5 | 4 |
| 9. Margarine containing 0.50% of a mixture comprising about 50% of dioleyl citrate and about 15% of monooleyl citrate. | do | 15.6 | 16.5 | 9 |
| 10. Margarine containing 0.50% of a mixture comprising about 50% distearyl citrate and about 15% monostearyl citrate. | do | 15.0 | 17.9 | 0.5 |

In the tables, the observation of the moisture leakage on the rolls is an index of the ability of the margarine in the form of a print to retain moisture. Again the amount of free moisture remaining in the mixer after addition of the excess moisture is inversely correlated with the ability of the margarine in the form of a print to retain moisture (i. e. the more moisture remaining in the mixer, the less ability the margarine has to retain excess moisture).

The samples of margarine for the determination of the relative moisture retaining efficacy were prepared as follows:

A margarine emulsion was prepared by mixing 80 parts of deodorized, hydrogenated vegetable margarine oils containing about 45% of soya bean oil and about 55% cottonseed oil, about 17 parts of cultured skim milk containing about 0.5% of sodium benzoate, and 3 parts of table salt. The deodorized, hydrogenated oil employed contained vitamins and 0.10% of vegetable lecithin. Also, in the case of the samples noted in the table as containing esters of citric acid, the esters were added to the margarine oil prior to the production of the emulsion. The emulsion was permitted to solidify by passing it over a chilled steel roll. It was then tempered by allowing it to stand at room temperature for about 16 hours, after which it was formed into prints. 400 grams of the tempered margarine were placed in a hand mixer; the margarine was partially plasticized by making 10 revolutions of the mixing handle. 50 grams of the margarine thus mixed were removed for determination of moisture content. To the 350 grams of margarine remaining in the mixer, 18 cc. of water were added, and the product containing the added water was mixed by making 50 revolutions of the mixing handle. The free moisture remaining in the mixer and not incorporated in the margarine was measured by volume; also, the moisture content of the margarine itself, to which the excess water had been added, was determined after draining off the free water which had not been incorporated into the margarine.

Thus, the moisture retaining capacities of these various preparations were evaluated in four ways:

1. By visual observation (product dry or showing moisture leakage), while coming over the chill roll and during printing after tempering. This bears on wet wrappers encountered in margarine production in cases of moisture leakage, and, in addition, is one way of estimating the relative tightness with which the milk moisture is bound in the finished margarine emulsion.

2. By the actual quantitative determination of the moisture content of the finished prints.

3. By visual observation and volume measurement of free water not incorporated into the margarine by the standardized mixing procedure described, after the addition of excess water to the finished print.

4. By the quantitative determination of the moisture content of the product to which excess water had been added after tempering the finished prints.

A review of Tables 1 and 2 reveals that no leakage was manifest by the margarine on the rolls when the margarine contained 0.25% or 0.5% of distearyl citrate. Also, no leakage was observed when 0.15% of a mixture of distearyl citrate, monostearyl citrate and tristearyl citrate (i. e. .075% of distearyl citrate) was used. On the other hand, slight leakage occurred when 0.25% of monostearyl citrate was incorporated in the margarine, and serious leakage also occurred when 0.25% or 0.5% of tristearyl citrate was employed. In fact, substantially the same serious leakage was discernible in the samples of margarine in which tristearyl citrate was used as when no ester was incorporated in the composition. At higher levels such as 0.5%, the monostearyl citrate showed satisfactory moisture retaining characteristics.

In Table 3, serious leakage was observed in the control sample of margarine having no esters incorporated therein, but no leakage was discernible when there was used 0.25% of a mixture comprising about 50% dioctyl citrate and about 15% of monooctyl citrate, or 0.25% of a mixture of about 50% dilauryl citrate and about 15% of monolauryl citrate, or 0.25% of a mixture comprising about 50% distearyl citrate and about 15% monostearyl citrate. Accordingly, these data demonstrate that a relatively small quantity of a dialkyl ester increases materially the moisture retention characteristics of margarine. Likewise, the dialkylene citrates also markedly improve the moisture retention characteristics of margarine as illustrated by the use of 0.5% of a mixture of about 50% dioleyl citrate and about 15% of monooleyl citrate as shown in Table 3.

And as shown in the copending applications of applicants, Serial Numbers 608,101, 608,102 and 608,380, the presence of a small quantity of monoalkyl or monoalkylene esters of citric acid markedly retard the rancidity of compositions containing glyceridic oils, including the fats in margarine. Therefore, by incorporating both a dialkyl or dialkylene citrate having at least 8 carbon atoms in the alkyl or alkylene group, and a monoalkyl or monoalkylene citrate in the margarine, the resulting product has substantial moisture retention characteristics and is not prone to become rancid.

Since both the dialkyl or dialkylene citrates and the monoalkyl or monoalkylene citrates are desirably incorporated in the margarine, it is advantageous to prepare a mixture of the mono and diesters of citric acid simultaneously. The mixture of mono and diesters of citric acid may be prepared by the esterification of citric acid and an alcohol, such as a monohydric primary or secondary alcohol, preferably by reacting the citric acid and the alcohol in proportions which favor the formation of the di and monoesters in the ratio desired in the mixture. The esterification may be conducted by any of the well known methods employed for the production of esters, and the resulting reaction mixture which may comprise not only the mono and diesters of citric acid, but a quantity of the triesters of citric acid, is subjected to treatment by fractional crystallization or selective extraction with a suitable solvent, if desired, which removes the major portion of the triesters of citric acid present. If desired, the mixture comprising principally the diester with a lesser amount of the mono and some of the triester, may be used in the margarine. To produce the mixture, a monohydric primary or secondary alkyl or alkylene alcohol, for example, may be reacted with citric acid monohydrate, by heating to an elevated temperature, such as 150° C., under reduced pressure until the reaction is complete. The reaction product without further purification may be incorporated in the margarine by addition during any stage of the production of the margarine. The term "margarine" in the description and claims includes butter, such as cow's butter.

Examples of the mono and di citric acid esters which may be incorporated in the margarine are the citric acid esters of the following alcohols: 2 ethyl-hexanol, octanols, decanols, dodecanols, hexadecanols, octadecanols, cosanols, docosanols, 2-ethyl hexenols, octenols, decenols, dodecenols, hexadenols, octadenols, cosenols and docosenols.

A more comprehensive understanding of the invention is obtained by reference to the following examples.

*Example 1.—Margarine containing monostearyl citrate, distearyl citrate and tristearyl citrate*

Monostearyl citrate and distearyl citrate may be incorporated in margarine by dissolving a mixture of monostearyl citrate, distearyl citrate and tristearyl citrate in a small quantity of the hydrogenated and deodorized oil employed for the margarine, and adding that solution of the stearyl esters to the body of the hydrogenated and deodorized margarine oil. For example, 2.5 lbs. of a mixture of monostearyl citrate, distearyl citrate and tristearyl citrate, prepared as described herein, are added at 145° F. to about 2½ lbs. of a hydrogenated and deodorized margarine oil comprising about 75% cottonseed oil and about 25% soya bean oil. This solution of the mixture of stearyl citrates is added at a temperature of about 110° F. to about 800 lbs. of hydrogenated and deodorized margarine oil comprising about 75% cottonseed oil and about 25% of soya bean oil, and including about 2 lbs. of lecithin and a minor quantity of the other usual constituents of margarine oil, such as vitamins. The stearyl citrates are thereby substantially uniformly dispersed throughout the margarine oil. This body of margarine oil containing the stearyl citrates is thoroughly mixed or churned with about 170 lbs. of cultured milk in accordance with the customary practice of margarine manufacture. During the mixing or churning, and preferably toward the end of the churning, about 30 lbs. of salt are added. The resulting mixture is then chilled by any suitable means, such as passage over chilled steel rolls or through ice water, or through an internal chilling unit. The chilled emulsion is kneaded into a mass, formed into prints and packaged.

The mixture of monostearyl citrate, distearyl citrate and tristearyl citrate for this purpose is prepared as follows:

12.1 kilos of citric acid monohydrate are added to 30 kilos of commercial stearyl alcohol (containing some palmityl alcohol) which is previously melted. During the addition, the mixture is agitated. The mixture is held at 150° C. under reduced pressure for a period of 1½ hours. At the end of this period, boiling and foaming ceases substantially. The resulting product which consists of a mixture of about 10 to 15% monostearyl citrate, about 50% distearyl citrate and the remainder tristearyl citrate together with a quantity of mono, di and tripalmityl citrates has an acid value of about 83, a saponification value of about 249 and a melting point of about 51 to 68° C. and a color on the Lovibond scale of about 35Y-5.8R.

*Example 2.—Margarine containing monolauryl citrate, dilauryl citrate and trilauryl citrate*

About 800 lbs. of hydrogenated and deodorized margarine oil comprising about 75% cottonseed oil and about 25% soya bean oil and including about 2 lbs. of lecithin and a minor quantity of the other usual constituents of margarine oil such as vitamins, are thoroughly mixed or churned with about 170 lbs. of cultured milk. During the mixing or churning, and preferably toward the end of the churning, about 35 lbs. of salt are added. The resulting mixture is then chilled through a chill vat. In this method of chilling, the churned mixture of oil and milk is sprayed into a vat of ice water. The chilled product is collected and worked mechanically or kneaded to remove entrapped ice water. This working may be performed on a large round revolving table with a corrugated wooden kneading roll. During the working, a water paste prepared by thoroughly mixing about 2 lbs. of water and 1 lb. of a mixture of monolauryl citrate, dilauryl citrate and trilauryl citrate produced as described herein, is thoroughly incorporated in the mass of chilled churned margarine. The worked mass is then formed into prints and packaged.

A mixture of monolauryl citrate, dilauryl citrate and trilauryl citrate is prepared in a similar manner to that described in Example 1 for the preparation of the mixed monostearyl citrate, distearyl citrate and tristearyl citrate except that 250 lbs. of commercial lauryl alcohol is used instead of the 30 kilos of commercial stearyl alcohol, and 120 lbs. of anhydrous citric acid is used instead of 12.1 kilos of citric acid monohydrate. The acid value of the mixture of about 10 to 15% monolauryl citrate, about 50% dilauryl citrate and the remainder trilauryl citrate is 118 and the saponification value is 314 compared respectively with theoretical values for pure dilauryl citrate of 105 and 314 respectively.

*Example 3.—Margarine containing distearyl citrate*

About 3 lbs. of distearyl citrate are dissolved at about 145° F. in about 3 lbs. of a hydrogenated and deodorized vegetable oil to be utilized as the oil component in the margarine. This solution of distearyl citrate is added at a temperature of about 110° F. to about 800 lbs. of hydrogenated and deodorized margarine oil comprising about 75% cottonseed oil, about 15% soya bean oil and about 10% peanut oil, and including 2 lbs. of lecithin and a minor quantity of the other usual constituents of margarine oil such as vitamins. The body of margarine oil containing the distearyl citrate is thoroughly mixed or churned with about 170 lbs. of cultured milk. During the mixing or churning about 30 lbs. of salt are added. The resulting mixture is then chilled, kneaded, formed into prints and packaged.

The substantially pure distearyl citrate employed in this example is produced by initially preparing a mixture of monostearyl citrate, distearyl citrate and tristearyl citrate as described in Example 1, and the distearyl citrate is separated from the resulting reaction mixture by fractional crystallization from a suitable solvent, such as ethanol or isopropanol, the tristearyl citrate coming out of solution before the distearyl citrate. The monostearyl citrate is retained in solution.

The pure distearyl citrate had an acid value of 76.4 and a saponification value of 240.2 (calculated acid value 80.6 and saponification value 242). Distearyl citrate, upon supercooling, exhibits a double melting point; one at 53° C. and a second melting point at 70 to 72° C.

*Example 4.—Margarine containing monooctyl citrate, dioctyl citrate and trioctyl citrate*

About 8 lbs. of a mixture of monooctyl citrate, dioctyl citrate and trioctyl citrate prepared as described herein are added at a temperature of about 110° F. to about 800 lbs. of a margarine oil comprising about 75% cottonseed oil, about 15% soya bean oil and about 10% peanut oil. This addition of the mixture of octyl citrates may be made in the storage tank, if desired, at any time prior to the pumping of the margarine oil to the churn or mixer. The margarine oil with the mixture of octyl citrates substantially dispersed throughout the mass of the oil is then mixed or churned with about 170 lbs. of cultured milk. During the churning, about 30 lbs. of salt are added. The resulting mixture is then chilled, kneaded, formed into prints and packaged.

A mixture of monooctyl citrate, dioctyl citrate and trioctyl citrate is prepared as follows:

150 lbs. of octyl alcohol (commercial 2-ethyl hexanol) were heated in a closed vessel with 137 lbs. of anhydrous citric acid for 6½ hours at 150–155° C. The reaction product comprised three layers, an upper ester layer, a middle aqueous layer and an almost crystalline sludge. The upper oily layer which comprised mono, di and trioctyl citrates was separated and deodorized for about 1½ hours under reduced pressure at 150° C. The odorless and light-colored and limpid product was found to have an acid value of 147.6 and a saponification value of 435 compared with theoretical values for dioctyl citrate of 135 and 405 respectively. The mixture contained about 20% monooctyl citrate, about 50% dioctyl citrate and the remainder trioctyl citrate.

*Example 5.—Margarine containing monooleyl citrate, dioleyl citrate, trioleyl citrate, monostearyl citrate, distearyl citrate and tristearyl citrate*

About 7.5 lbs. of a mixture prepared as described herein of monooleyl citrate, dioleyl citrate, trioleyl citrate, monostearyl citrate, distearyl citrate and tristearyl citrate are added to about 7.5 lbs. of an oil to be utilized as the oil component of the margarine. The mixture of oleyl and stearyl citrates is added at a temperature of about 110° F. to about 800 lbs. of a margarine oil comprising about 75% cottonseed oil, about 15% soya bean oil and about 10% peanut oil. The margarine is then mixed or churned with about 170 lbs. of cultured milk, and about 30 lbs. of salt are added during the churning. The mixture is then chilled, kneaded, formed into prints and packaged.

The mixture to be incorporated in margarine of the distearyl citrate, the dioleyl citrate and the corresponding mono and triesters together with the mixed esters is prepared as follows:

A mixture of 14 kilos of commercial oleyl alcohol and 14 kilos of commercial stearyl alcohol are melted. To this mixture is added 10.2 kilos of anhydrous citric acid. During the addition, the mixture is agitated. The mixture is heated and held for a period of 1¼ hours at 150° C. under reduced pressure. At the end of this period, boiling and foaming ceases substantially. The mixture contains the distearyl citrate, dioleyl citrate and their corresponding mono and triesters together with mixed esters containing both stearyl and oleyl groups.

*Example 6.—Dairy butter containing dialkyl or dialkylene citric acid esters and monoalkyl or monoalkylene citric acid esters*

Dialkyl or dialkylene citric acid esters and monoalkyl or monoalkylene citric acid esters may be incorporated in dairy butter in the same manner that these esters or mixtures of esters are incorporated in margarine. For example, the esters may be added to butter oil instead of margarine oil as described in Examples 1, 3, 4 and 5, or the mixture of mono and diesters may be incorporated in the butter by use of a paste containing the esters as described in Example 2. If the esters are added to the butter oil, the butter oil may be prepared, for example, as described in U. S. Patent 2,414,837 granted to the assignee of L. K. Riggs on January 28, 1947. After relatively uniform dispersion of the esters throughout such butter oil, the butter oil may be formed into butter as described in said U. S. Patent 2,414,837. In the event a water paste of the citric acid esters is employed, the paste may be worked into the dairy butter in the same manner as it is worked into margarine as described in Example 2. The same quantities of mono and diesters of citric acid may be utilized as employed for margarine in Examples 1 to 5.

The incorporation of monoesters of citric acid in margarine or butter in accordance with this invention markedly improves the flavor life and prevents the so-called flavor reversion which is characteristic of certain glyceridic oils such as soya bean oil. This improvement in flavor life is shown in the following table in which a sample of butter fat containing .05% by weight of pure monostearyl citrate was compared periodically over a period of 38 days with an identical sample of butter fat without any ester or other composition added to it.

Flavor

|  | Fresh | 4 Days | 12 Days | 18 Days | 26 Days | 38 Days |
|---|---|---|---|---|---|---|
| Butter fat containing .05% by weight of pure monostearyl citrate. | Good—Sweet Cream Flavor. | Good—Sweet Cream Flavor. | Good—Sweet Cream Flavor. | Good—Sweet Cream Flavor. | Good—Sweet Cream Flavor. | Good—Sweet Cream Flavor. |
| Same butter fat without any ester therein | do | do | Fair—old butter flavor. | Fair—old butter flavor. | Poor—strong flavor. | Poor—strong flavor. |

The butter fat containing the pure monostearyl citrate and that without any ester therein were subjected to storage under identical conditions at 90° F.

In order to avoid uncontrolled variables, the butter fat for this testing was prepared from 2 quarts of fresh heavy cream. The fat was obtained from the cream by first churning it into butter, melting the resulting butter at 42° C., decanting the fat and filtering the decanted fat after centrifuging. The tests were made on this butter fat. The butter fat was divided into two portions and to one portion .05% by weight of pure monostearyl citrate was added. The flavor testing was determined by four experts skilled in discerning the flavor of food products, and all four experts were in agreement with the flavor characteristics recorded in the table. This improvement of the flavor life resulting from the incorporation of monoesters in margarine is particularly important with butter fats and other glyceridic oils such as soya bean oil which are susceptible to detrimental changes in flavor over a period of time.

The terms and expressions which we have employed are used as terms of description and not of limitation, and we have no intention, in the use of such terms and expressions, of excluding any equivalents of the features shown and described or portions thereof, but recognize that various modifications are possible within the scope of the invention claimed.

What is claimed is:

1. A composition of matter containing oleaginous and aqueous components and selected from the class consisting of margarine and dairy butter, and having incorporated therein 0.05 to 1.5% by weight of a diester of citric acid selected from the class consisting of dialkyl esters of citric acid and dialkylene esters of citric acid, in which the alkyl and alkylene groups have at least 8 carbon atoms.

2. A composition of matter containing oleaginous and aqueous components and selected from the class consisting of margarine and dairy butter, and having incorporated therein 0.05 to 1.5% by weight of a diester of citric acid and 0.002 to 1% of a monoester of citric acid, said diester of citric acid being selected from the class consisting of dialkyl esters of citric acid and dialkylene esters of citric acid, in which the alkyl and alkylene groups have at least 8 carbon atoms and said monoester of citric acid being selected from the class consisting of monoalkyl esters of citric acid and monoalkylene esters of citric acid.

3. A margarine containing oleaginous and aqueous components and having incorporated therein 0.1 to 0.3% by weight of a dialkyl ester of citric acid in which the alkyl group has at least 16 carbon atoms.

4. A margarine containing oleaginous and aqueous components and having incorporated therein 0.2 to 0.5% by weight of a dialkyl ester of citric acid in which the alkyl group has from 8 to 16 carbon atoms.

5. A margarine containing oleaginous and aqueous components and having incorporated therein ¼ to ½% by weight of a dialkylene ester of citric acid in which the alkylene group has at least 16 carbon atoms.

6. A margarine containing oleaginous and aqueous components and having incorporated therein 0.1 to 0.3% by weight of a dialkyl ester of citric acid in which the alkyl group has at least 16 carbon atoms and 0.01 to 0.1% by weight of a monoalkyl ester of citric acid in which the alkyl group has at least 16 carbon atoms.

7. A margarine containing oleaginous and aqueous components and having incorporated therein 0.2 to 0.5% by weight of a dialkyl ester of citric acid in which the alkyl group has from 8 to 16 carbon atoms and 0.01 to 0.1% by weight of a monoalkyl ester of citric acid in which the alkyl group has from 8 to 16 carbon atoms.

8. A margarine containing oleaginous and aqueous components and having incorporated therein ¼ to ½% by weight of a dialkylene ester of citric acid in which the alkylene group has at least 16 carbon atoms and 0.01 to 0.1% by weight of a monoalkylene ester of citric acid in which the alkylene group has at least 16 carbon atoms.

9. A margarine containing oleaginous and aqueous components and having incorporated therein 0.1 to 0.3% by weight of distearyl citrate.

10. A margarine containing oleaginous and aqueous components and having incorporated therein 0.1 to 0.3% by weight of a mixture of distearyl citrate and dipalmityl citrate.

11. A method of improving a composition of matter containing oleaginous and aqueous components and selected from the class consisting of margarine and dairy butter, said method comprising incorporating in the composition of matter 0.05 to 1.5% by weight of a diester of citric acid selected from the class consisting of dialkyl esters of citric acid and dialkylene esters of citric acid, in which the alkyl and alkylene groups have at least 8 carbon atoms.

12. The method of producing a composition of matter containing oleaginous and aqueous components and selected from the class consisting of margarine and dairy butter, said method comprising incorporating in the composition of matter 0.05 to 1.5% by weight of a diester of citric acid and 0.002 to 1% of a monoester of citric acid, said diester of citric acid being selected from the class consisting of dialkyl esters of citric acid and dialkylene esters of citric acid, in which the alkyl and alkylene groups have at least 8 carbon atoms, and said monoester of citric acid being selected from the class consisting of monoalkyl esters of citric acid and monoalkylene esters of citric acid.

HANS W. VAHLTEICH.
RALPH H. NEAL.
CHESTER M. GOODING.

REFERENCES CITED

The following references are of record in the file of this patent:

UNITED STATES PATENTS

| Number | Name | Date |
|---|---|---|
| 1,857,274 | Emhardt | May 10, 1932 |
| 2,122,716 | Graves | July 5, 1938 |
| 2,197,269 | Guillaudeu | Apr. 16, 1940 |